United States Patent
Emberling (10) Patent No.: US 11,847,462 B2
(45) Date of Patent: Dec. 19, 2023

(54) SOFTWARE-BASED INSTRUCTION SCOREBOARD FOR ARITHMETIC LOGIC UNITS

(71) Applicant: ADVANCED MICRO DEVICES, INC., Santa Clara, CA (US)

(72) Inventor: Brian Emberling, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/122,089

(22) Filed: Dec. 15, 2020

(65) Prior Publication Data

US 2022/0188120 A1 Jun. 16, 2022

(51) Int. Cl.
*G06F 9/38* (2018.01)
*G06F 7/57* (2006.01)

(52) U.S. Cl.
CPC .............. *G06F 9/3838* (2013.01); *G06F 7/57* (2013.01)

(58) Field of Classification Search
CPC .................................................... G06F 9/3838
See application file for complete search history.

(56) References Cited

U.S. PATENT DOCUMENTS

| 6,950,926 | B1* | 9/2005 | Menezes | G06F 9/30076 |
| | | | | 712/216 |
| 2004/0098570 | A1* | 5/2004 | Giri | G06F 9/3836 |
| | | | | 712/241 |

| 2004/0230777 | A1 | 11/2004 | Busaba | |
| 2014/0372730 | A1 | 12/2014 | Qadri et al. | |
| 2019/0138313 | A1 | 5/2019 | Lin | |
| 2020/0065113 | A1* | 2/2020 | Gutierrez | G06T 1/20 |
| 2022/0075627 | A1* | 3/2022 | Foley | G06F 9/22 |

FOREIGN PATENT DOCUMENTS

JP 2925842 B2 7/1999

OTHER PUBLICATIONS

International Search Report and Written Opinion dated Apr. 1, 2022 for PCT/US2021/063019, 10 pages.
Cristinel Ababei, "EE-379 Embedded Systems and Applications," Spring 2013, <http://www.dejazzer.com/ee379/ lecture_notes/lec02_computer_basics.pdf>, Accessed on Apr. 13, 2022, 34 pages.
International Preliminary Report on Patentability dated June 29, 2023 for PCT/US2021/063019, 7 pages.

* cited by examiner

*Primary Examiner* — Michael J Metzger (57) ABSTRACT

A software-based instruction scoreboard indicates dependencies between closely-issued instructions issued to an arithmetic logic unit (ALU) pipeline. The software-based instruction scoreboard inserts one or more control words into the command stream between the dependent instructions, which is then executed by the ALU pipeline. The control words identify the instruction(s) upon which the dependent instructions depend (parent instructions) so that the GPU hardware can ensure that the ALU pipeline does not stall while the dependent instruction waits for results from the parent instruction.

20 Claims, 4 Drawing Sheets

SOFTWARE-BASED INSTRUCTION SCOREBOARD FOR ARITHMETIC LOGIC UNITS

BACKGROUND

Conventional processing systems include processing units such as a central processing unit (CPU) and a graphics processing unit (GPU) that implement audio, video, and multimedia applications, as well as general purpose computing in some cases. The physical resources of a GPU include shader engines and fixed function hardware units that are used to implement user-defined reconfigurable virtual pipelines. For example, a conventional graphics pipeline for processing three-dimensional (3-D) graphics is formed of a sequence of fixed-function hardware block arrangements supported by programmable shaders. Processing on a GPU is typically initiated by application programming interface (API) calls (e.g., draw calls) that are processed by a CPU. A draw call is a command that is generated by the CPU and transmitted to the GPU to instruct the GPU to render an object (or a portion of an object) in a frame.

The graphics hardware in a GPU typically includes arithmetic logic units (ALUs) such as a scalar ALU or a vector ALU, which are implemented as corresponding pipelines and used to perform arithmetic operations such as add, subtract, multiply, divide, and move, as well as performing various transcendental functions. In some cases, one pipeline is used to implement most of the arithmetic functions and a separate pipeline is used to implement the more complex transcendental functions. Instructions for the ALU are held in an instruction buffer until an arbiter picks the instructions for execution on one of the pipelines. Some instructions in the instruction buffer are dependent upon other instructions, e.g., the source registers for a first (dependent) instruction receive input from the destination registers of a second instruction. The second instruction must therefore complete before the first instruction is executed.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

An ALU pipeline has a length that corresponds to a predetermined number of cycles, such as a four-cycle long pipeline. A dependent instruction can therefore stall if it is sent to the pipeline before completion of the instruction it depends upon. For example, if an add instruction is dependent upon a move instruction and the ALU pipeline is four cycles long, the add instruction stalls for three cycles if it is sent to the pipeline one cycle after the move instruction. A conventional GPU includes a hardware instruction scoreboard to store information (e.g., in one or more flops) that is used to delay transmission of dependent instructions to the ALU pipeline until completion of the instructions that the dependent instructions depend upon. For example, in some cases, the instruction scoreboard includes six registers (entries) to store information indicating the processing status of six instructions that were previously issued to the pipeline. Every instruction compares its source registers to the destination registers of the instructions in the instruction scoreboard to identify any dependencies. If an instruction is dependent upon one or more of the instructions in the instruction scoreboard, the corresponding entry in the instruction scoreboard is monitored to determine when to send the dependent instruction to the pipeline. This process involves circuitry to perform instruction decoding and numerous comparisons of the registers. Consequently, the hardware instruction scoreboard incurs high costs in both power consumption and area on the chip.

FIGS. 1-4 illustrate an instruction scoreboard for the ALU pipeline that is implemented in software to reduce power consumption and area consumed by hardware in the GPU. The software-based instruction scoreboard indicates dependencies between instructions issued to the ALU pipeline with a separation between instructions smaller than the pipeline duration (referred to as "closely-spaced" instructions). The software-based instruction scoreboard selectively inserts one or more delay instructions, referred to as "control words", into the command stream between the dependent instructions in the program code, which is then executed by the GPU. The control words identify the instruction(s) upon which the dependent instructions depend (referred to herein as "parent instructions") so that the GPU hardware does not issue the dependent instruction to the ALU pipeline and cause the ALU pipeline to stall because the parent instruction has not yet completed.

In some embodiments, the software-based instruction scoreboard inserts a control word into the command stream immediately prior to the dependent instruction and the control word indicates the previous instruction from which the dependent instruction depends. For example, the control word indicates that the next instruction in the command stream depends on the Nth previous vector ALU (VALU) instruction. In some embodiments, the software-based instruction scoreboard implements a control word compression technique to include two or more delay values identifying two or more dependencies of upcoming instructions in a single control word to reduce instruction stream overhead. For example, a single control word identifies a parent instruction to the next instruction in the command stream and further includes a "skip" indicator identifying an instruction issuing subsequent to the next instruction as dependent on another instruction in the command stream. This control word compression technique can apply to any number of dependency specifiers per control word. In some embodiments, the control word indicates a dependency of one instruction on two or more parent instructions executing at more than one ALU pipeline. For example, in some embodiments the control word indicates a dependency on instructions executing at both a scalar ALU pipeline and at a vector ALU pipeline, or on both a special function unit (e.g., sine/cosine) ALU pipeline and one of the scalar ALU pipeline and the vector ALU pipeline.

The software-based instruction scoreboard generates the control words based on a dependency graph maintained by a compiler. The dependency graph identifies all dependencies within a program. However, not every dependent instruction requires the delay occasioned by a control word. Depending on the depth of the ALU pipeline and the number of independent instructions issuing between a parent instruction and a dependent instruction, it may not be necessary to insert extra idle cycles between the parent instruction and the dependent instruction. In some embodiments, the software-based instruction scoreboard only inserts control words as necessary, based on the number of independent instructions between dependent instructions and the number of stages of the ALU pipeline. For example, if the dependent instruction issues more than a threshold number of cycles based on the length of the ALU pipeline after its parent instruction, the parent instruction will have completed before the dependent instruction issues, and no additional idle cycles will be needed to avoid a stall of the dependent instruction. Thus, the software-based instruction scoreboard only inserts a control word in the command stream if the dependent instruction issue within the threshold number of cycles after its parent instruction. In some embodiments, the threshold number of cycles is based on the number of stages of the ALU pipeline. The techniques described herein are, in different embodiments, employed at any of a variety of parallel processors (e.g., vector processors, graphics processing units (GPUs), general-purpose GPUs (GPGPUs), non-scalar processors, highly-parallel processors, artificial intelligence (AI) processors, inference engines, machine learning processors, other multithreaded processing units, and the like).

Figure 1:
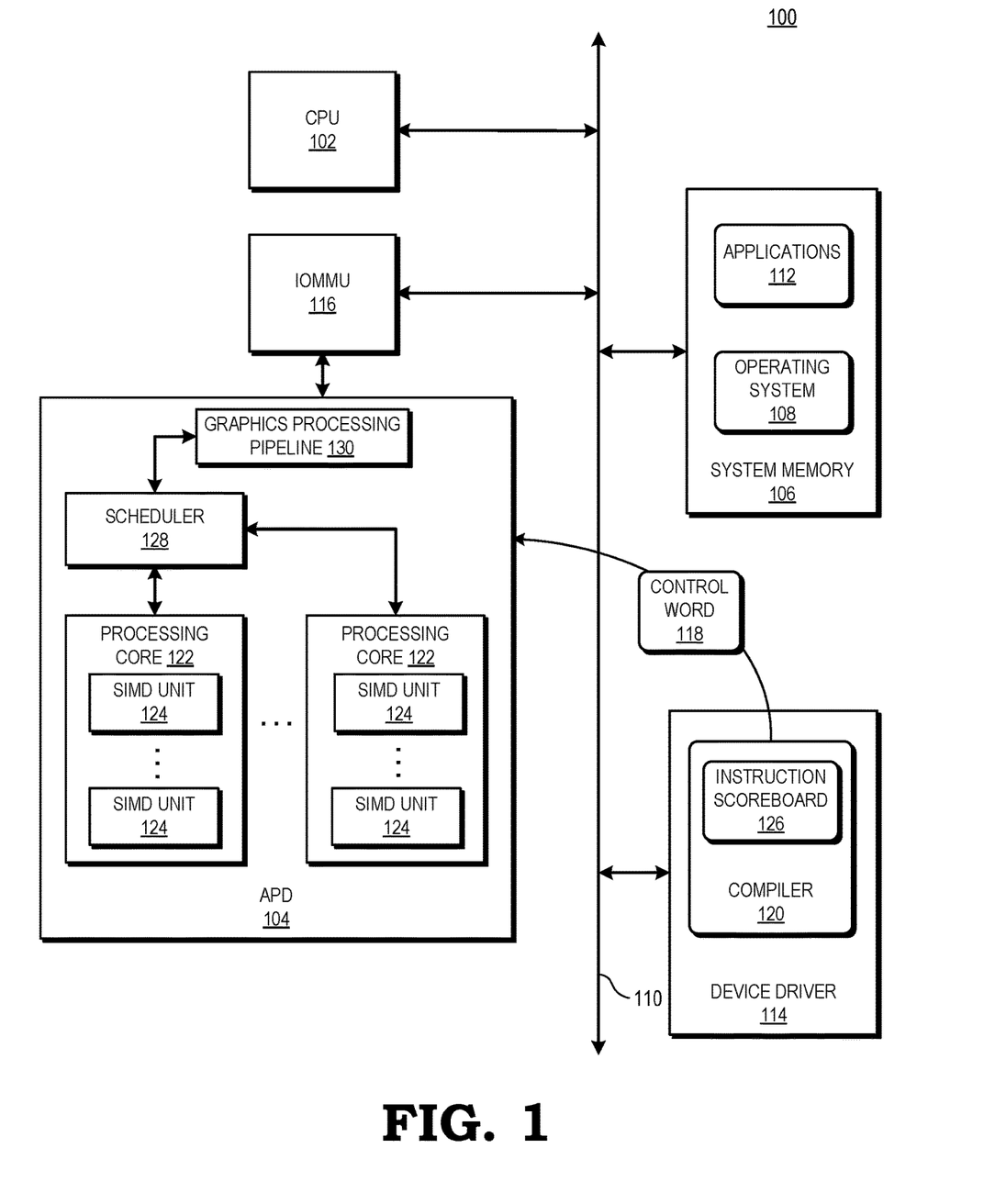
FIG. 1 is a block diagram of a processing system employing a software-based instruction scoreboard in accordance with some embodiments.

FIG. 1 illustrates a processing system 100 employing a software-based instruction scoreboard in accordance with some embodiments. The processing system 100 includes a central processing unit (CPU) 102 and an example of a parallel processor, accelerated processing device (APD) 104. In various embodiments, the CPU 102 includes one or more single- or multi-core CPUs. In various embodiments, the APD 104 includes any cooperating collection of hardware and/or software that perform functions and computations associated with accelerating graphics processing tasks, data parallel tasks, nested data parallel tasks in an accelerated manner with respect to resources such as conventional CPUs, conventional graphics processing units (GPUs), and combinations thereof. In the embodiment of FIG. 1, the processing system 100 is formed on a single silicon die or package that combines the CPU 102 and the APD 104 to provide a unified programming and execution environment. This environment enables the APD 104 to be used as fluidly as the CPU 102 for some programming tasks. In other embodiments, the CPU 102 and the APD 104 are formed separately and mounted on the same or different substrates. It should be appreciated that processing system 100 may include more or fewer components than illustrated in FIG. 1. For example, processing system 100 may additionally include one or more input interfaces, non-volatile storage, one or more output interfaces, network interfaces, and one or more displays or display interfaces.

As illustrated in FIG. 1, the processing system 100 also includes a system memory 106, an operating system 108, a communications infrastructure 110, and one or more applications 112. Access to system memory 106 is managed by a memory controller (not shown), which is coupled to memory 106. For example, requests from the CPU 102 or other devices for reading from or for writing to system memory 106 are managed by the memory controller. In some embodiments, the one or more applications 112 include various programs or commands to perform computations that are also executed at the CPU 102. The CPU 102 sends selected commands for processing at the APD 104. The operating system 108 and the communications infrastructure 110 are discussed in greater detail below. The processing system 100 further includes a device driver 114 and a memory management unit, such as an input/output memory management unit (IOMMU) 116. Components of processing system 100 may be implemented as hardware, firmware, software, or any combination thereof. In some embodiments the processing system 100 includes one or more software, hardware, and firmware components in addition to or different from those shown in FIG. 1.

Within the processing system 100, the system memory 106 includes non-persistent memory, such as DRAM (not shown). In various embodiments, the system memory 106 stores processing logic instructions, constant values, variable values during execution of portions of applications or other processing logic, or other desired information. For example, parts of control logic to perform one or more operations on CPU 102 may reside within system memory 106 during execution of the respective portions of the operation by CPU 102. During execution, respective applications such as applications 112, operating system functions such as operating system 108, processing logic commands, and system software reside in system memory 106. Control logic commands that are fundamental to operating system 108 generally reside in system memory 106 during execution. In some embodiments, other software commands (e.g., device driver 114) also reside in system memory 106 during execution of processing system 100.

The IOMMU 116 is a multi-context memory management unit. As used herein, context is considered the environment within which the kernels execute and the domain in which synchronization and memory management is defined. The context includes a set of devices, the memory accessible to those devices, the corresponding memory properties, and one or more command-queues used to schedule execution of a kernel(s) or operations on memory objects. The IOMMU 116 includes logic to perform virtual to physical address translation for memory page access for devices, such as the APD 104. In some embodiments, the IOMMU 116 also includes, or has access to, a translation lookaside buffer (TLB) (not shown). The TLB is implemented in a content addressable memory (CAM) to accelerate translation of logical (i.e., virtual) memory addresses to physical memory addresses for requests made by the APD 104 for data in system memory 106.

In various embodiments, the communications infrastructure 110 interconnects the components of processing system 100. Communications infrastructure 110 includes (not shown) one or more of a peripheral component interconnect (PCI) bus, extended PCI (PCI-E) bus, advanced microcontroller bus architecture (AMBA) bus, advanced graphics port (AGP), or other such communication infrastructure and interconnects. In some embodiments, communications infrastructure 110 also includes an Ethernet network or any other suitable physical communications infrastructure that satisfies an application's data transfer rate requirements. Communications infrastructure 110 also includes the functionality to interconnect components, including components of processing system 100.

A driver, such as device driver 114, communicates with a device (e.g., APD 104) through an interconnect or the communications infrastructure 110. When a calling program invokes a routine in the device driver 114, the device driver 114 issues commands to the device. Once the device sends data back to the device driver 114, the device driver 114 invokes routines in an original calling program. In general, device drivers are hardware-dependent and operating-system-specific to provide interrupt handling required for any necessary asynchronous time-dependent hardware interface. In some embodiments, a compiler 120 is embedded within device driver 114. The compiler 120 compiles source code into program instructions as needed for execution by the processing system 100. During such compilation, the compiler 120 may apply transforms to program instructions at various phases of compilation. In other embodiments, the compiler 120 is a stand-alone application.

The CPU 102 includes one or more of a control processor, field programmable gate array (FPGA), application specific integrated circuit (ASIC), or digital signal processor (DSP), although these entities are not shown in FIG. 1 in the interest of clarity. The CPU 102 executes at least a portion of the control logic that controls the operation of the processing system 100. For example, in various embodiments, the CPU 102 executes the operating system 108, the one or more applications 112, and the device driver 114. In some embodiments, the CPU 102 initiates and controls the execution of the one or more applications 112 by distributing the processing associated with one or more applications 112 across the CPU 102 and other processing resources, such as the APD 104.

The APD 104 executes commands and programs for selected functions, such as graphics operations and other operations that may be particularly suited for parallel processing. In general, APD 104 is frequently used for executing graphics pipeline operations, such as pixel operations, geometric computations, and rendering an image to a display. In some embodiments, APD 104 also executes compute processing operations (e.g., those operations unrelated to graphics such as video operations, physics simulations, computational fluid dynamics, etc.), based on commands or instructions received from the CPU 102. For example, commands can be considered special instructions that are not typically defined in the instruction set architecture (ISA) of the APD 104. A command can be executed by a special processor, such a dispatch processor, command processor, or network controller.

In various embodiments, the APD 104 includes one or more compute units, such as one or more processing cores 122 that include one or more SIMD units 124 that execute a thread concurrently with execution of other threads in a wavefront, e.g., according to a single-instruction, multiple-data (SIMD) execution model. The SIMD execution model is one in which multiple processing elements such as arithmetic logic units (ALUs) share a single program control flow unit and program counter and thus execute the same program but are able to execute that program with different data. Some embodiments of the APD 104 are used to implement a GPU and, in that case, the processing cores 122 are referred to as shader cores or streaming multi-processors (SMXs). The number of processing cores 122 that are implemented in the APD 104 is a matter of design choice.

Each of the one or more processing cores 122 executes a respective instantiation of a particular work-item to process incoming data, where the basic unit of execution in the one or more processing cores 122 is a work-item (e.g., a thread). Each work-item represents a single instantiation of, for example, a collection of parallel executions of a kernel invoked on a device by a command that is to be executed in parallel. A work-item may be executed by one or more processing elements as part of a work-group executing at a processing core 122.

The APD 104 includes GPUs that issue and execute work-items including groups of threads executed simultaneously as a "wavefront" on a single SIMD unit 124. Multiple wavefronts are included in a "work group," which includes a collection of work-items designated to execute the same program. A work group is executed by executing each of the wavefronts that make up the work group. In some embodiments, the wavefronts are executed sequentially on a single SIMD unit 124 or partially or fully in parallel on different SIMD units. In other embodiments, all wavefronts from a workgroup are processed at the same processing core 122. Wavefronts may also be interchangeably referred to as warps, vectors, or threads. In some embodiments, wavefronts include instances of parallel execution of a shader program, where each wavefront includes multiple work-items that execute simultaneously on a single SIMD unit 124 in line with the SIMD paradigm (e.g., one instruction control unit executing the same stream of instructions with multiple data). A scheduler 128 performs operations related to scheduling various wavefronts on different processing cores 122 and SIMD units 124, as well as performing other operations for orchestrating various tasks on the APD 104.

The parallelism afforded by the one or more processing cores 122 is suitable for graphics related operations such as pixel value calculations, vertex transformations, tessellation, geometry shading operations, and other graphics operations. A graphics processing pipeline 130 accepts graphics processing commands from the CPU 102 and thus provides computation tasks to the one or more processing cores 122 for execution in parallel. Some graphics pipeline operations, such as pixel processing and other parallel computation operations, require that the same command stream or compute kernel be performed on streams or collections of input data elements. Respective instantiations of the same compute kernel are executed concurrently on multiple SIMD 124 units in the one or more processing cores 122 in order to process such data elements in parallel. As referred to herein, for example, a compute kernel is a function containing instructions declared in a program and executed on an APD processing core 122. This function is also referred to as a kernel, a shader, a shader program, or a program.

The width of a wavefront is a characteristic of the hardware of SIMD units 124 of the APD 104. In various embodiments, the APD 104 includes GPU architecture that issues wavefronts of a constant, fixed size that depends on the GPU hardware's microarchitecture. Each processing core 122 includes one or more processing elements such as scalar and/or vector floating-point units, arithmetic logic units (ALUs), and the like. In various embodiments, the processing cores 122 also include special purpose processing units (not shown), such as inverse-square root units and sine/cosine units.

A work-item (e.g., thread) in a wavefront executes on a SIMD hardware lane (hereinafter referred to as a "SIMD lane") during its execution. In one embodiment, the processing elements of each SIMD unit 124 are arranged into arrays that each includes sixteen ALUs (referred to as lanes), where each lane executes the same instruction at the same time as the other lanes in the SIMD unit 124 but can execute that instruction with different data and with each work-item mapped to a lane during execution. In some embodiments, a wavefront is a group of sixty-four threads, referred to as a wave64 (and thus each thread of the wavefront is assigned to a lane ranging from 0 to 63), which are issued in groups of sixteen threads through a sixteen-lane-wide SIMD unit over four cycles. However, those skilled in the art will recognize that the width of wavefronts and SIMD units 124 may include any configuration or number of threads (e.g., 8, 16, 32, 64, and the like) without departing from the scope of this disclosure.

To facilitate the identification of dependencies without incurring the costs in power consumption and area of a hardware instruction scoreboard, the compiler 120 includes a software-based instruction scoreboard 126 to insert control words such as control word 118 into a command stream to indicate the dependency of an instruction on another instruction. Based on the control word 118, the SIMD units 124 delay execution of dependent instructions until the instructions on which they depend (the parent instructions) have completed.

Figure 2:
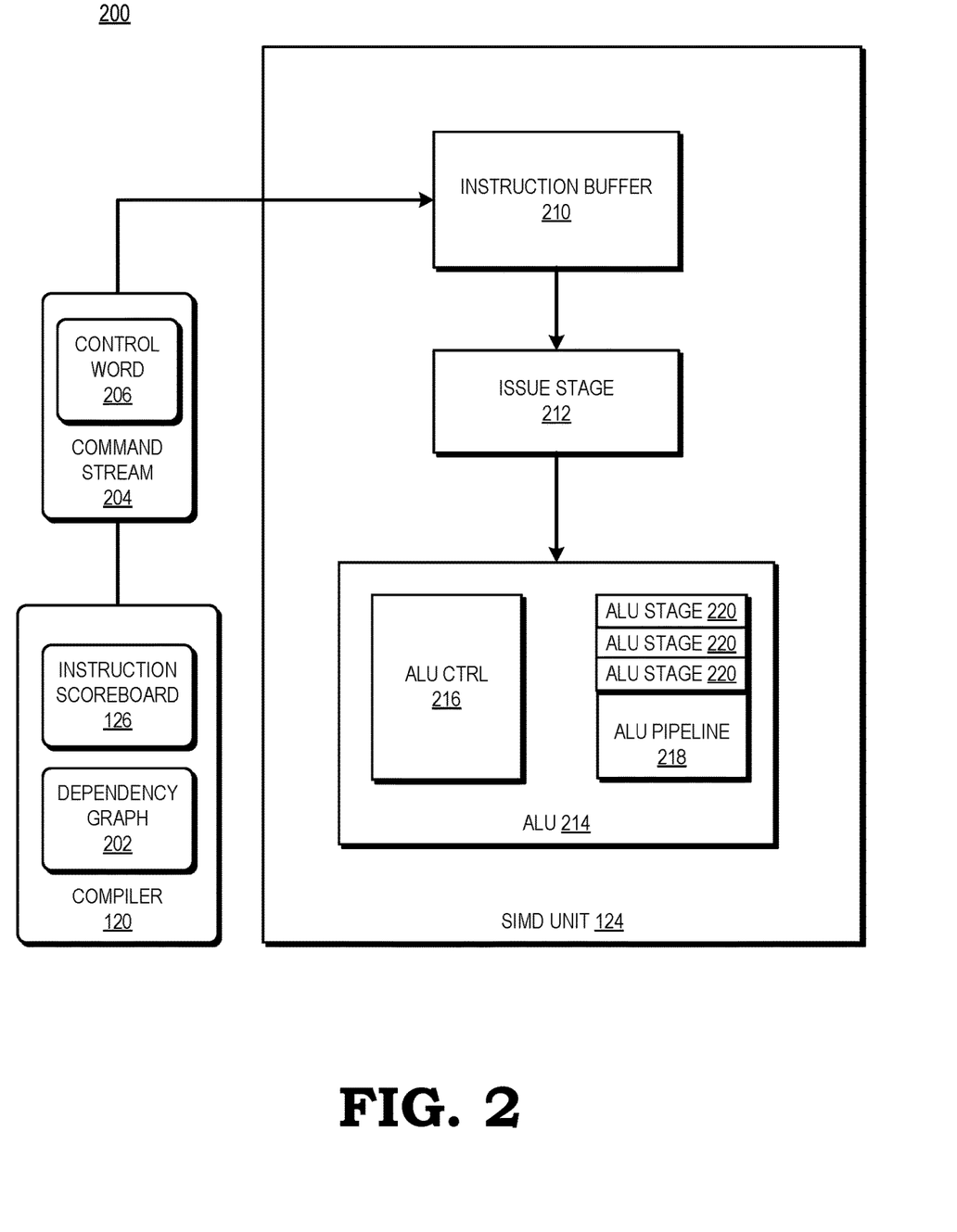
FIG. 2 is a block diagram of a software-based instruction scoreboard inserting a control word indicating a dependency of an instruction into a command stream in accordance with some embodiments.

FIG. 2 is a block diagram of a portion 200 of the processing system 100 illustrating a compiler 120 inserting a control word 206 indicating a dependency of an instruction into a command stream 204 of instructions for execution at the SIMD units 124 in accordance with some embodiments. Each SIMD unit 124 includes an instruction buffer 210, an issue stage 212, and a plurality of arithmetic logic units (ALUs) 214 (only one of which is illustrated). In some embodiments, one or more of the instruction buffer 210 and the issue stage 212 are shared among multiple SIMD units 124 while in other embodiments each SIMD unit 124 includes its own instruction buffer and issue stage. In the course of executing operations, the compiler 120 generates a set of instructions to be executed at the ALU 214. Examples of ALU instructions include add instructions, multiply instructions, matrix manipulation instructions, and the like. The SIMD unit 124 stores the ALU instructions at the instruction buffer 210 for execution. The issue stage 212 controls one or more pointers that point to entries of the instruction buffer 210. The issue stage 212 manipulates the pointers to read instructions from the instruction buffer and provide the read instructions to the ALU 214. The reading of an instruction from the instruction buffer 210 and provision of the instruction to the ALU 214 is referred to as "issuing" the instruction to the ALU 214.

The ALU 214 executes the issued instructions to carry out mathematical operations defined by the instructions. To facilitate execution of the instructions, the ALU 214 includes an ALU control module 216 and an ALU pipeline 218. The ALU pipeline 218 includes a plurality of pipeline stages (e.g., stages 220) wherein each stage carries out one or more operations based on the instruction being executed and in particular based on data provided by the previous stage of the ALU pipeline 218. Thus, an issued instruction begins execution at an initial stage of the ALU pipeline 218, the initial stage provides the results of the execution to the second stage which executes operations based the received data and provides the results to the third stage, and so on until the instruction reaches a final stage of the ALU pipeline 218, which stores a final result of the operation at a register file (not shown) or other storage location of the SIMD unit 124. Further, the ALU pipeline 218 executes instructions in a pipelined fashion, such that each stage of the ALU pipeline 218 concurrently executes a different instruction. That is, for a given cycle of the ALU pipeline 218, the initial stage executes one instruction, the second stage another instruction, the third stage still another instruction, and so on.

The ALU control module 216 monitors conditions at the ALU pipeline 218 and, based on the monitored conditions, controls which stages execute instructions for a given cycle. That is, in some embodiments the ALU control module 216 controls gating of clock signals and other control signals to determine, for a given cycle, which stages of the ALU pipeline 218 execute instructions. For example, under some conditions a stage of the ALU pipeline 218 will enter a stall condition, wherein the stage is awaiting operations at another execution unit before the stage can proceed, such as awaiting data from a cache or awaiting preparation of a cache line to store data. The ALU control module 216 detects the stall condition at the stage and suspends execution at other stages of the ALU pipeline 218 while the stall condition persists, thereby preventing instructions from proceeding to the stalled stage and causing execution errors.

The compiler 120 generates a dependency graph 202 identifying all dependencies within a software program to be executed at each of the SIMD units 124 and generates a command stream 204 of instructions for execution at the SIMD units 124. Based on the dependency graph 202, the software-based instruction scoreboard 126 identifies parent instructions and dependent instructions that are scheduled to issue without any intervening instructions or that are scheduled to issue within a threshold number of cycles of each other. The software-based instruction scoreboard 126 inserts the control word 206 into the command stream 204 to identify a dependent instruction and the parent instruction from which the dependent instruction depends.

In some embodiments, the software-based instruction scoreboard 126 only inserts the control word 206 into the command stream in response to determining that no (or an insufficient number of) intervening instructions are scheduled to issue between a parent instruction and a dependent instruction. In some embodiments, the software-based instruction scoreboard 126 determines the sufficiency of the number of intervening instructions based on the number of stages in the ALU pipeline 218. For example, if the ALU pipeline 218 has four stages and there are fewer than four intervening instructions issuing between the parent instruction and the dependent instruction, the software-based instruction scoreboard 126 determines that the parent instruction and the dependent instruction are closely-spaced, and inserts a control word 206 into the command stream 204 indicating the dependency of the dependent instruction on the parent instruction. However, if there are more than four intervening instructions issuing between the parent instruction and the dependent instruction, the software-based instruction scoreboard 126 bypasses inserting a control word 206 into the command stream, because the parent instruction will have completed before the dependent instruction issues without the need for a further delay.

In response to receiving the control word 206, the ALU control module 216 suspends execution of the dependent instruction until after the parent instruction completes execution. The number of cycles it takes for the parent instruction to complete is the number of cycles after the issue cycles have passed until the ALU 214 produces a result that can be consumed by a subsequent instruction. In some embodiments, the number of cycles it takes for the parent instruction to complete execution depends on the widths of the parent and dependent instruction wavefronts. For example, for wave32 wavefronts, the number of cycles for the parent instruction to complete execution is the number of cycles it takes to issue the parent instruction plus the length of the ALU pipeline 218 (i.e., the number of ALU stages 220 in the ALU pipeline 218). For wave64 wavefronts, the number of cycles for the parent instruction to complete execution depends on whether the parent instruction is issued once or twice. In some embodiments, a wave64 wavefront is issued in two passes, and the ALU control module 216 issues the dependent instruction after the first pass of the parent instruction completes but before the second pass of the parent instruction completes such that the dependent instruction overlaps with the second pass of the parent instruction.

Figure 3:
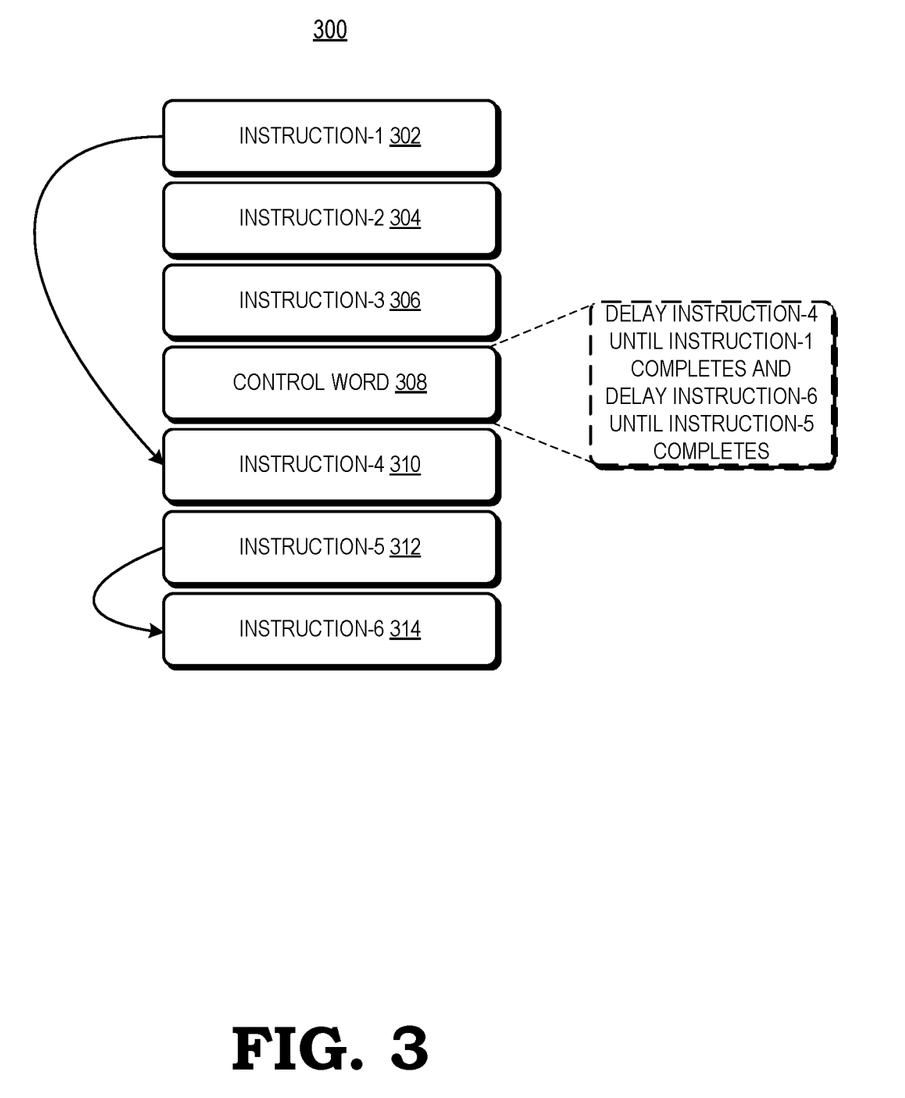
FIG. 3 is a block diagram of a control word indicating a dependency of an instruction inserted in a command stream in accordance with some embodiments.

FIG. 3 is a block diagram of a control word 308 indicating a dependency of an instruction inserted in a command stream 300 in accordance with some embodiments. The command stream 300 includes instructions instruction-1 302, instruction-2 304, instruction-3 306, instruction-4 310, instruction-5 312, and instruction-6 314. In the illustrated example, instruction-4 310 is dependent on instruction-1 302 and instruction-6 314 is dependent on instruction-5 312.

To indicate the dependencies and instruct the ALU control module 216 to delay dependent instructions, instruction-4 310 and instruction-6 314, until their respective parent instructions, instruction-1 302 and instruction-5 312, have completed, the software-based instruction scoreboard 126 inserts control word 308 into the command stream 300 before instruction-4 310. The control word 308 includes an identifier of the ALU 214 at which the parent instruction(s) are executing and an indication of the number of intervening instructions issuing between the parent instruction and the dependent instruction. In the illustrated embodiment, the control word 308 identifies the instruction-4 310 as being dependent on the instruction that issued 3 cycles before instruction-4 310 and identifies instruction-6 314 as being dependent on the instruction that issued 1 cycle before instruction-6 314. The control word 308 includes a "skip" code to identify the second dependent instruction (instruction-6 314) and its dependency on instruction-5 312. In an embodiment of the illustrated example, the control word 308 is DataDependency instID0=3, Skip=2, instID1=1 in which instID0=3 declares that the instruction word that immediately follows the control word 308 (instruction-4 310) is dependent on the instruction that issued 3 cycles before instruction-4 310 (instruction-1 302), Skip=2 means that the next delay is not for the next instruction, but for the instruction after the next instruction (instruction-6 314), and instID1=1 declares that instruction-6 314 is dependent on the instruction that issued 1 cycle before instruction-6 314 (instruction-5 312). In response to receiving the control word 308, the ALU control module 216 adds delays before issuing each of instruction-4 310 and instruction-6 314.

Figure 4:
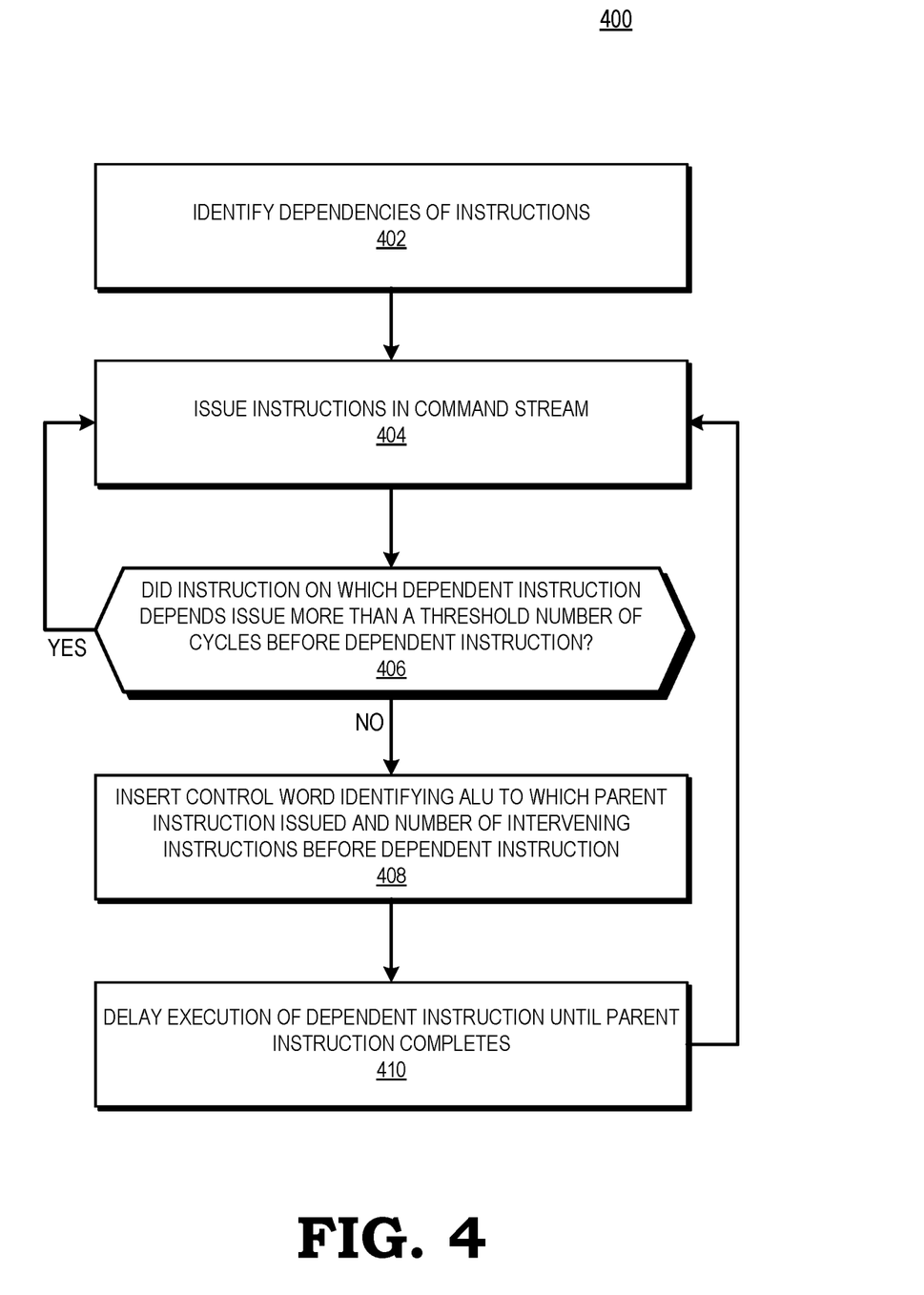
FIG. 4 is a flow diagram illustrating a method for inserting a control word indicating a dependency of an instruction into a command stream and delaying issuance of a dependent instruction based on the control word in accordance with some embodiments.

FIG. 4 is a flow diagram illustrating a method 400 for inserting a control word indicating a dependency of an instruction into a command stream in accordance with some embodiments. The method 400 is described with respect to an example implementation at the processing system 100 of FIG. 1. At block 402, the compiler 120 identifies dependencies of instructions. For example, in some embodiments, the compiler 120 generates a dependency graph 202 identifying each dependency within a software program. At block 404, the compiler 120 issues instructions in a command stream 300. At block 406, the software-based instruction scoreboard 126 determines whether an instruction on which a dependent instruction depends (a parent instruction) issued more than a threshold number of cycles before the dependent instruction. In some embodiments, the threshold number is based on the number of ALU stages 220 in the ALU pipeline 218. If, at block 406, the software-based instruction scoreboard 126 determines that the parent instruction issued more than the threshold number of cycles before the dependent instruction, the method flow continues back to block 404.

If, at block 406, the software-based instruction scoreboard 126 determines that the parent instruction did not issue more than the threshold number of cycles before the dependent instruction, the method flow continues to block 408. At block 408, the software-based instruction scoreboard 126 inserts a control word 308 into the command stream 300. The control word 308 identifies the ALU 214 to which the parent instruction issued and the number of intervening instructions between issuance of the parent instruction and the dependent instruction. In some embodiments, the control word 308 indicates dependencies of more than one instruction by, for example, including a skip indicator. At block 410, the ALU control module 216 delays execution of the dependent instruction until after the parent instruction completes.

In some embodiments, the apparatus and techniques described above are implemented in a system including one or more integrated circuit (IC) devices (also referred to as integrated circuit packages or microchips), such as the processing system described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    inserting a control word into a command stream of a wavefront, the command stream comprising a first instruction for execution at an arithmetic logic unit (ALU) pipeline of a single instruction multiple data (SIMD) unit configured to execute wavefronts based on graphics commands received from a processor separate from the SIMD unit, the control word indicating a first dependency of the first instruction on a second instruction for execution at the ALU pipeline, the ALU pipeline comprising a plurality of stages, wherein inserting the control word is in response to the first instruction issuing less than a threshold number of instructions after issuance of the second instruction, and wherein the control word is received from a compiler of a device driver implemented at circuitry separate from the SIMD unit.

2. The method of claim 1, further comprising:
    delaying, at the ALU pipeline, execution of the first instruction based on the control word.

3. The method of claim 1, wherein inserting the control word comprises:
    inserting the control word in response to the first instruction and the second instruction issuing without any intervening instructions.

4. The method of claim 1, wherein the control word comprises:
    an identifier of the ALU at which the second instruction is executing; and
    an indication of a number of instructions issuing between issuance of the second instruction and issuance of the first instruction.

5. The method of claim 1, further comprising:
    indicating, in the control word, at least one second dependency of at least one third instruction on at least one fourth instruction for execution at the ALU pipeline.

6. A method, comprising:
    receiving, at a single instruction multiple data (SIMD) unit from circuitry separate from the SIMD unit, a control word indicating that a first instruction is dependent on a second instruction in response to the first instruction issuing less than a threshold number of instructions after issuance of the second instruction; and
    delaying, at an arithmetic logic unit (ALU) pipeline of the SIMD unit comprising a plurality of stages, execution of the first instruction by inserting the control word into a command stream of a wavefront, wherein the ALU pipeline is configured to execute wavefronts generated based on graphics commands received from a processor separate from the SIMD unit.

7. The method of claim 6, further comprising:
    receiving the control word in an instruction stream in response to the first instruction and the second instruction issuing without any intervening instructions.

8. The method of claim 6, wherein the threshold number is based on the number of stages of the ALU pipeline.

9. The method of claim 6, wherein the control word comprises:
    an identifier of the ALU at which the second instruction is executing; and
    an indication of a number of instructions issuing between issuance of the second instruction and issuance of the first instruction.

10. The method of claim 6, further comprising:
    indicating, in the control word, a second dependency of a third instruction on a fourth instruction for execution at the ALU pipeline.

11. The method of claim 1, wherein inserting the control word is performed during a runtime of the wavefront at the ALU pipeline, subsequent to issuance of the second instruction to the ALU pipeline and subsequent to issuance of the first instruction to the ALU pipeline.

12. The method of claim 10, wherein the control word comprises:
    an indication of a number of instructions issuing between issuance of the second instruction and issuance of the first instruction;
    a skip code that specifies a number of instructions between the control word and the fourth instruction; and
    an indication of a number of instructions issuing between issuance of the fourth instruction and issuance of the third instruction.

13. A device, comprising:
    a single instruction multiple data (SIMD) unit comprising an arithmetic logic unit (ALU) pipeline comprising a plurality of stages configured to execute wavefronts generated based on graphics commands received from a processor separate from the SIMD unit; and circuitry separate from the SIMD unit, wherein the circuitry implements a device driver that uses a compiler to:
    insert a control word into a command stream of a wavefront, the command stream comprising a first instruction for execution at the ALU pipeline in response to the first instruction issuing less than a threshold number of instructions after issuance of a second instruction, the control word indicating a first dependency of the first instruction on the second instruction for execution at the ALU pipeline.

14. The device of claim 13, wherein the ALU pipeline is configured to:
    delay execution of the first instruction based on the control word.

15. The device of claim 13, wherein the control word comprises:
    an identifier of the ALU at which the second instruction is executing; and
    an indication of a number of instructions issuing between issuance of the second instruction and issuance of the first instruction.

16. The device of claim 13, wherein the circuitry is further configured to:
    indicate, in the control word, a second dependency of a third instruction on a fourth instruction for execution at the ALU pipeline.

17. The method of claim 8, wherein the threshold number is smaller than the number of stages of the ALU pipeline.

18. The device of claim 13, wherein the threshold number is smaller than the number of stages of the ALU pipeline.

19. The device of claim 13, wherein the processor comprises the circuitry that implements the device driver.

20. The device of claim 13, wherein the circuitry that implements the device driver is separate from the processor.

* * * * *